May 7, 1935. A. N. GOLDSMITH 2,000,697
TALKING MOTION PICTURE APPARATUS
Filed May 26, 1932 3 Sheets-Sheet 1

INVENTOR
ALFRED N. GOLDSMITH
BY
ATTORNEY

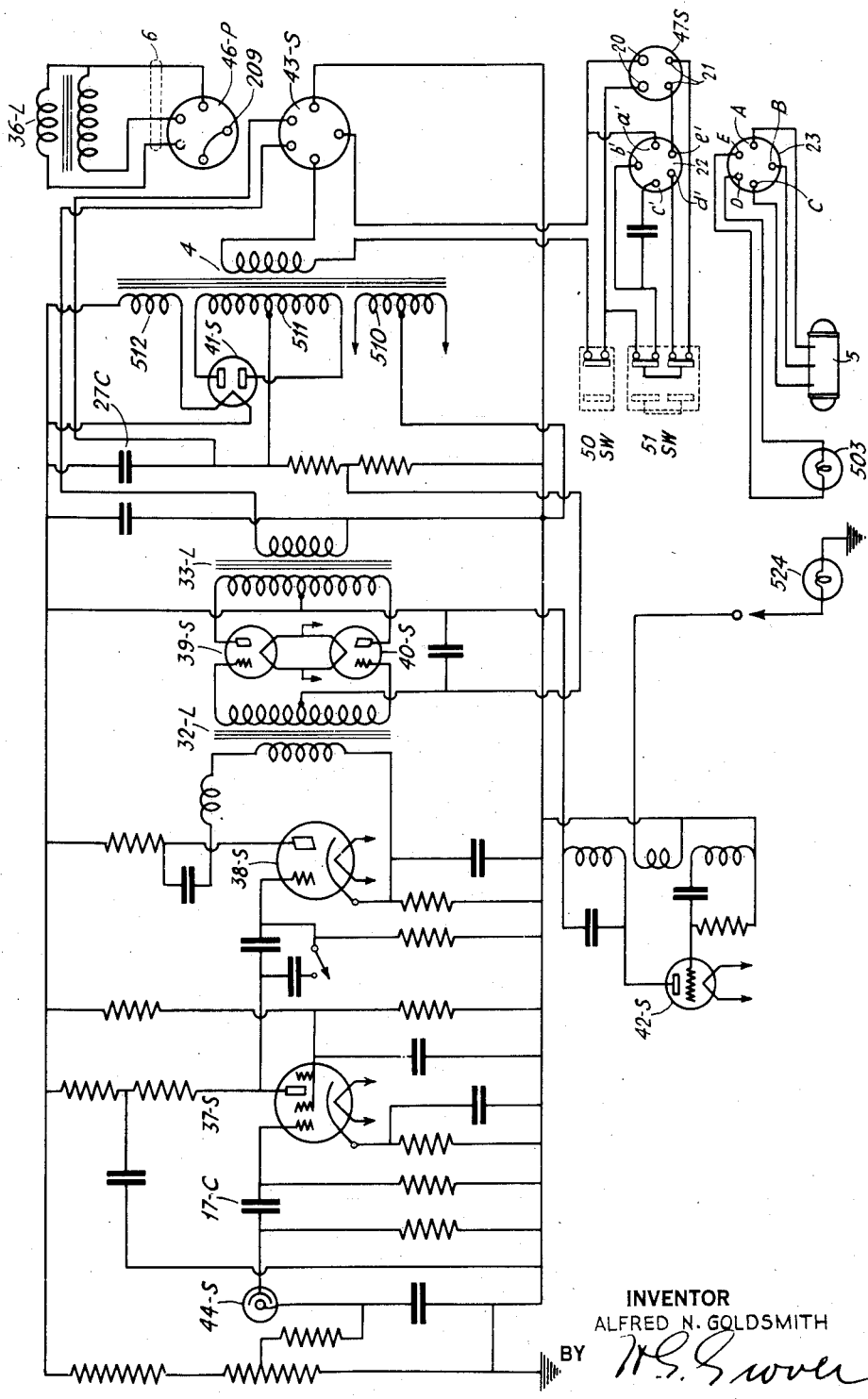

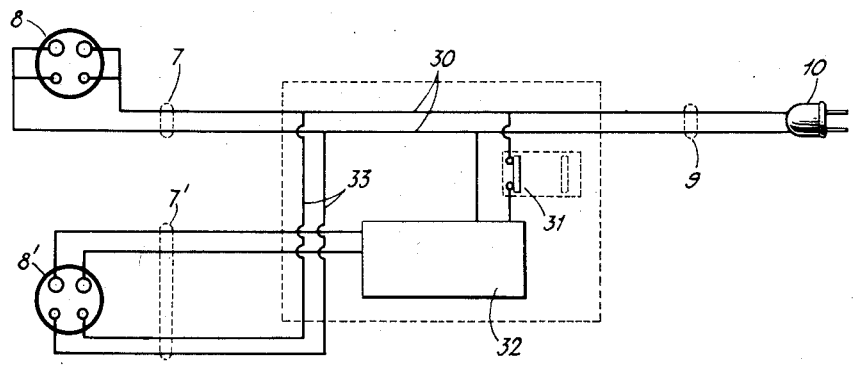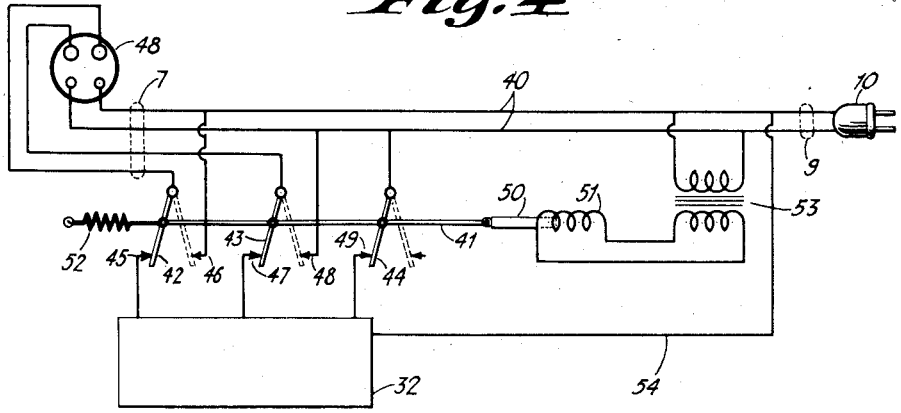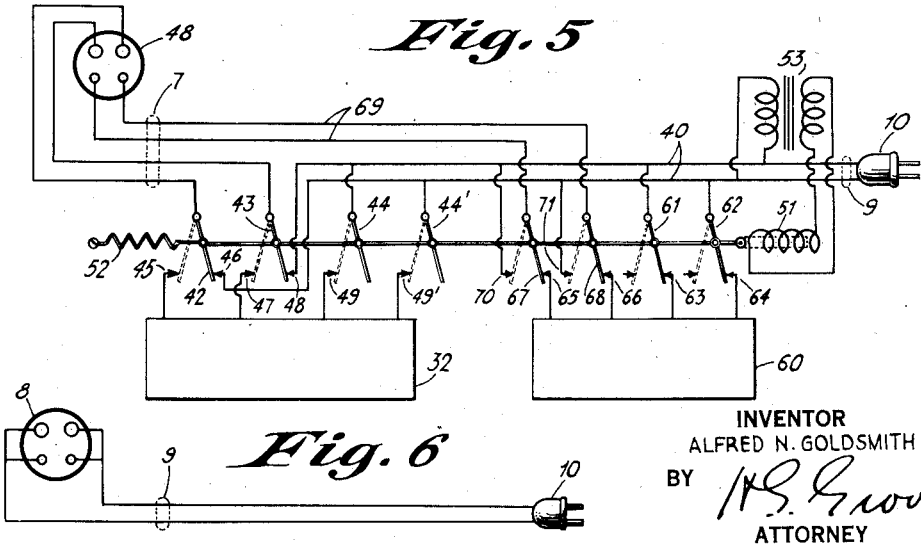

Patented May 7, 1935

2,000,697

UNITED STATES PATENT OFFICE 2,000,697

TALKING MOTION PICTURE APPARATUS

Alfred N. Goldsmith, New York, N. Y., assignor to Radio Corporation of America, a corporation of Delaware Application May 26, 1932, Serial No. 613,701

13 Claims. (Cl. 179—100.3)

This invention relates to talking motion picture apparatus and more particularly to the variety thereof involving a portable apparatus which is a combination motion picture projector and sound reproducer, and includes a sound pick-up such as is used for optically picking up sounds from a sound-track on a picture film or magnetic sound pick-up for disc records and also includes an amplifier in the same unit. Such apparatuses, being portable, sometimes are used on alternating current and sometimes are used on direct current according to which is available at the particular location.

It has heretofore been the practice to either build a distinct type of apparatus for use on direct current or to provide a motor-generator set to change the direct current into alternating current so that it could be used to operate the A. C. machines which, for many reasons, are preferable to the D. C. type of machines.

My invention provides in combination with such an apparatus, a power converting means for supplying each of the various portions of the apparatus with the type of current most appropriate to it irrespective of what kind of power supply may be used.

One object of the invention is to provide means for supplying the projection lamp with direct current and at the same time providing the amplifier with alternating current.

Another object of the invention is to provide means for operating the motor and amplifier of the projector with alternating current and the projector lamp with direct current irrespective of what kind of current may be supplied to the apparatus.

Another object of the invention is to provide automatic connections which will necessarily attain the foregoing objects.

Another object of the invention is to provide such an apparatus which can be conveniently manufactured of a uniform pattern for either operation entirely on alternating current or for the types of operation stated in the foregoing objects without materially increasing the cost thereof over that incidental to strictly A. C. operation.

Another object of the invention is to provide such a power supply converting mechanism which is substantially uniform in the general size and shape of its container with that of the projector, to provide convenience in handling.

Another object of the invention is to provide such a power converting unit which can be used as a stand for the projector.

In the drawings:

Fig. 2 is a wiring diagram of the projector unit of Fig. 1 as modified for the use of my invention.

Fig. 3 is a schematic wiring diagram of the power supply unit shown in Fig. 1.

Fig. 4 is a schematic wiring diagram of a second form of power supply unit adapted for automatic control.

Fig. 5 is a diagrammatic illustration of the connection used when the projector is to be used on alternating current only.

Fig. 6 illustrates another modification of my invention.

Figure 1:
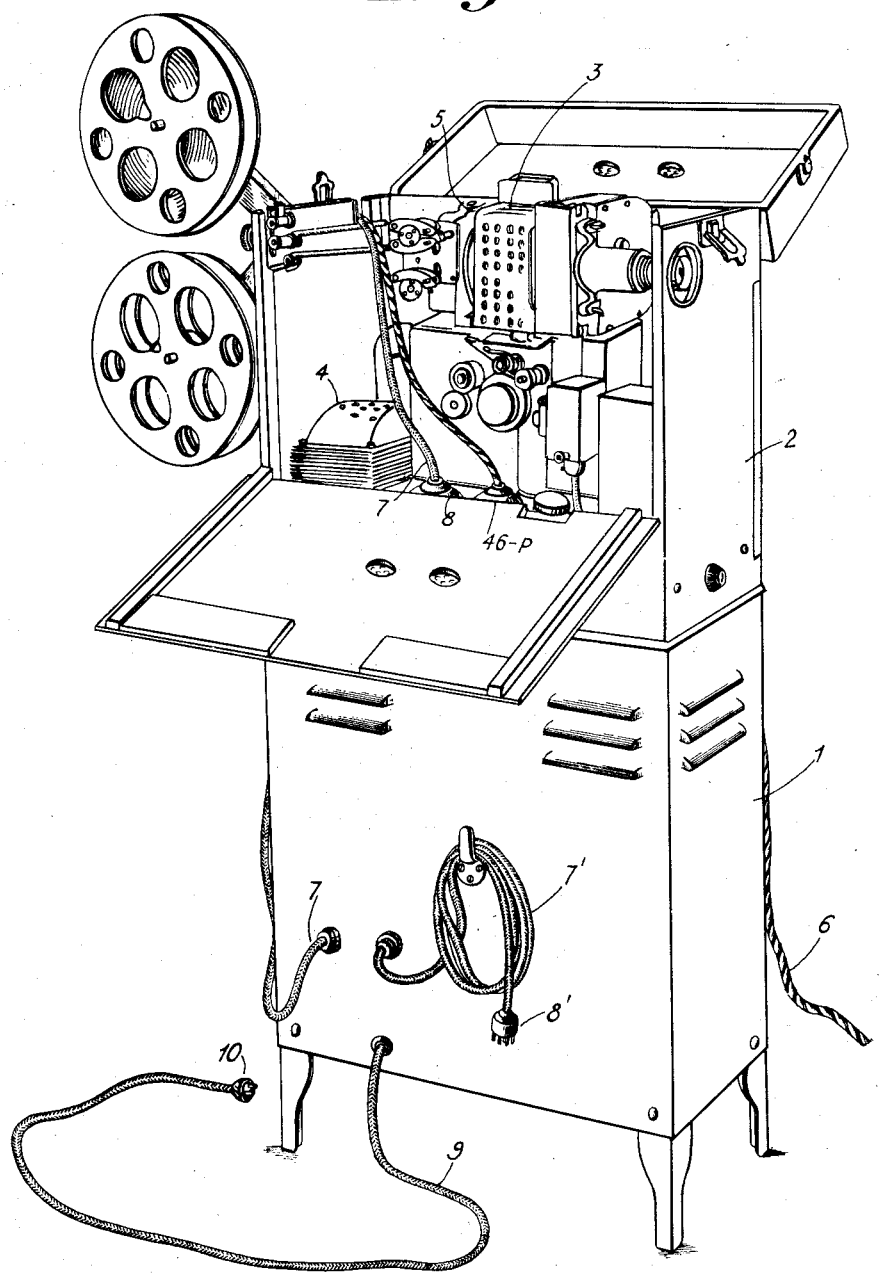
Fig. 1 is a pictorial representation of a commercial type of 16 mm. projector as provided with the apparatus of my invention.

As shown in Fig. 1, I provide the casing 1 which serves as a support for the projector 2 and also serves to house the mechanism of my power supply means. The projector 2 is illustrated as being a 16 mm. sound-on-film projector of the type commercially known as the RCA Victor PG-38 but this projector of course may be of any other type.

The projector is provided with an amplifier in the base thereof and is provided with an incandescent projection lamp in the housing 3. These incandescent projection lamps are adapted for use on either alternating or direct current but it is highly advantageous to operate them on direct current at all times, as a higher light intensity can be secured with no greater risk of burning out the lamp on account of the absence of "peak" currents and the lamp at the same time will have a longer life due to the absence of tendency toward crystallization which exists in metallic filaments operated at high current values and at correspondingly high temperatures on alternating currents.

The amplifier is supplied with current through the transformer 4 which provides a set-up of alternating current to a relatively high voltage for supplying the plate currents of the vacuum tubes through a rectifier and which also provides a step-down of the alternating current to a low voltage for operating the filaments or other cathodes of the vacuum tubes.

The projector is further provided with a motor 5 which is preferably adapted to operate exclusively on alternating current, as such a motor can be made inherently of a constant speed type with little difficulty and without the use of brushes, commutators and the like, whereas a direct current motor would not only have brushes and commutators but would also require a speed regulator in order to render the speed thereof independent of load or voltage, and even this would not render the speed as constant as can be readily secured with an A. C. motor.

In the present form of my invention the usual loudspeaker cord 6 extends from the amplifier in the base of the projector toward the loudspeaker adjacent the screen and is disconnectable from the amplifier. The power supply is introduced through the cord 7 and the plug 8, and this cord leads to the power supply unit housed in the casing 1 as indicated.

Power is supplied to the converter through the usual extension cord 9 which is provided with a plug which is adapted to be fitted into the ordinary outlet.

If the operation of the converter is not intended to be automatic, an additional cord and plug 7', 8' are provided so that if, for example, the cord 7 is used when alternating current is supplied, then the cord 7' would be used when direct current is supplied.

Referring now to the wiring diagram shown in Fig. 2 which shows the circuit of commercial form of apparatus to which applicant's invention is applied (Docket 6332) (Serial No. 597,819 filed March 9, 1932) and which will therefore be described only in a general manner:

The transformer 4, before referred to, is provided with secondary windings 510 which provides current for the filaments or heaters of the amplifier tubes, 511 which provides the high voltage current for the plates, and 512 which provides filament current for the rectifier tube 41S. The high voltage current passes through a filter system comprising the condenser 27C and the field magnet winding of the loudspeaker indicated at 36L and thence to the plates of the various tubes, the loudspeaker being connected to the amplifier and power supply by means of the plugs 46P and 43S. The acoustically modulated light from the soundtrack strikes the photocell 44S to which voltage is applied through the resistances shown, and which is coupled through the condenser 17C to the amplifying tube 37S, shown as a screen-grid tube, which is likewise resistance-capacity coupled to the second amplifier tube 38S. The capacity between these two tubes is variable, as shown, for the purpose of regulating tone quality. The tube 38S is coupled by the transformer 32L to the amplifying tubes 39S and 40S which are arranged in push-pull relation, and these are coupled through the transformer 33L to the loudspeaker through the receptacle 43S, the plug 46P and the cord 6 as indicated. In order to safeguard the amplifier from excessive voltage when the loudspeaker is disconnected, a short-circuiting connection at 209 is provided which opens the primary circuit of the transformer 4 when the plug 46P is removed. The transformer 4 also supplies current to the tube 42S which is connected in an oscillating circuit as shown and supplies current to the exciter lamp indicated at 524 in order to operate this by alternating current at such a frequency that film temperature fluctuations thereof will be inaudible. The picture projection lamp is indicated at 593.

The portion of this circuit important in the present case is the power supply receptacle 47S and the portions of the circuit immediately related thereto. The receptacle 47S is in the base of the projector 2 and receives the plug 8 or 8', and from this receptacle the current is directed to the amplifier and lamp respectively. The receptacle 47S is provided with two pairs of contacts, as shown. The upper pair of these, indicated at 20, are connected to the input transformer of the amplifier and to the motor, and must be supplied when in operation with alternating current; while the other pair of contacts indicated at 21 are connected to the projection lamp and should be supplied with direct current if it is available, but may be supplied with alternating current.

From the contacts 20 current passes through the switch 50SW to the amplifier, so that the projection lamp and motor may be operated without reproducing sound if desired. From these contacts a pair of wires likewise pass through the upper contacts of the switch 51SW and to the contacts A', B', C' of the plug 22 which cooperate with the contacts A, B and C of the receptacle 23 to supply the motor 5 with alternating current.

From the contacts 21 wires pass through the lower pair of contacts of the switch 51SW to the contacts D' and E' of the plug 22 which cooperate with the contacts D and E of the receptacle 23 to supply the projection lamp with current.

It will be apparent that when the switch 51SW is open so that the motor is stopped, the projection lamp is likewise turned "off" so that there is no danger of igniting the film.

The various converter circuits which are adapted to cooperate with the foregoing amplifier and projector circuit by insertion of their outlet plugs into the receptacle 47S are illustrated in detail in Figs. 3, 4, 5 and 6 and are described in that sequence:

Fig. 3 shows the circuit arrangement of a converter using two cords as shown in Fig. 1. In this arrangement current passes into the device through the plug 10 and cord 9, if alternating is permitted to pass directly through the leads 30 to the cord 7 and the plug 8, and in this case the projection lamp will be operated on alternating current as well as the rest of the apparatus. If only direct current is available, the switch 31 is closed and current passes into the inverter 32 which produces alternating current from the direct current and then passes through the cord 7' to the upper pair of contacts on the plug 8' which, cooperating with the corresponding contacts of the receptacle 47S, provide motor and amplifier with alternating current. In this case direct current will be taken through the leads 33 to the other pair of contacts of the plug 8' and supply the lamp with direct current. The inverter 32 may be of any type adapted to produce constant-frequency alternating current from direct current but is preferably of the thermionic mercury vapor type such as is illustrated, for example, in Prince Patent 1,654,945.

A modification of the device shown in Fig. 3 which is automatic in operation and avoids the use of two cords is shown in Fig. 4. In this device current for the lamp in each case passes from the plug 10 through the cord 9, leads 40, and cord 8 to the lower pair of contacts of the plug 48 for supplying the projector lamp with which ever type of current is impressed upon the plug 10. A multi-pole switch 41 is provided having blades 42, 43 and 44 which cooperate respectively with the contacts 45, 46; 47, 48; and 49. The actuating bar of the switch is provided with a magnetic core 50 which cooperates with the coil 51 and is also provided with a retracting spring 52. Current is fed to the coil 41 through transformer 53 which is provided with a primary circuit of very high resistance.

When alternating current is impressed on the plug 10, the cord 9 and the leads 40, a portion of this current passes through the transformer 53 where it is preferably stepped down to a relatively low voltage and to the solenoid 51 which thereupon attracts the core 50 and thereby moves the contacts of the switch 41 to the right against the action of the spring 52. This opens the connection between the blade 44 and the contact 49 and connects the blades 42 and 43 respectively to the contacts 46 and 48. This permits alternating current to flow from the lines 40 through the contacts 46 and 48 and the blades 42 and 43 to the upper pair of contacts of the plug 48, thereby supplying the amplifier and motor with alternating current.

If direct current instead of alternating is impressed on the plug 10, this likewise passes through the cord 9 and leads 40 to the lower pair of contacts 48, but it fails to excite the transformer 53 and the solenoid 51, and the switch 41 therefore remains in the lefthand position, as shown. In this case the circuit to the inverter 32 is closed through the lead 54 and through the contact 49 and blade 44 so that current from the lines 40 passes to the inverter and this supplies alternating current to the contacts 45 and 47 which are now connected to the blades 42 and 43; and this alternating current therefore passes through the cord 8 and to the upper pair of contacts of the plug 48 thereby supplying the amplifier and motor with alternating current.

In order to provide the projection lamp at all times with direct current and also to provide the motor and amplifier at all times with alternating current, I have provided the further modification shown in Fig. 5. In this form of the device, the operation of the transformer 53 and the solenoid control 51 is exactly as described in Fig. 4, and the connections and function of the switch blades 42, 43 and 44 and the contacts 45, 46, 47, 48 and 49 is also the same, an additional pair of contacts 44', 49' being provided to open both sides of the circuit to the inverter 32 which therefore functions to provide the upper pair of contacts and plug 48 with alternating current in a manner similar to that described in reference to Fig. 4. In addition, however, I provide a rectifier 60 which may be of any desired type such as a motor generator set, or a copper oxide, or mercury-vapor rectifier, and which is of sufficient capacity to supply the current necessary for the projection lamp. This rectifier is connected in a manner very similar to that used in connecting the inverter 32; that is, when the switch is in the right-hand position, alternating current is being supplied to the leads 40. This alternating current passes through the switch blades 61 and 62 to the contacts 63 and 64 which feed the rectifier, and after rectification the current passes out through the contacts 65 and 66 to the switch blade 67 and 68 and thence through the leads 69 to the lower pair of contacts of the plug 48. If the switch is in the lefthand position, as when direct current is supplied to the plug 10, then current from the lines 40 passes through the contacts 70 and 71 to the switch blades 67 and 68 and thence to the leads 69, thereby supplying direct current to the lamp directly from the line. In this case, of course, the circuit through the blades 61 and 62 to the contacts 63 and 64 remains open. Appropriate chokes and condensers may be provided in the rectifier circuit to smooth out the ripples in the rectified current and thereby permit the use of a higher average voltage. If the lamp requires a different voltage from that of the line, the A. C. is transformed to an appropriate voltage before rectification.

As before described, in order to permit the projector to cooperate with any or all of the foregoing devices, I have provided it with a four-pole receptacle 47S and if the projector is to be used entirely on alternating current I may provide it with the connecting cord shown in Fig. 6, where both pairs of contacts of the plug 8 are connected directly to cord 9. The provision of such a cord makes it possible to provide a projector adapted to cooperate with any of the foregoing rectifying or inverting devices and which can at the same time be adapted for use directly on alternating current exclusively, and at but little more expense than if the projector were designed to operate exclusively on alternating current.

Having described my invention and the various modifications thereof, I claim:

1. Talking motion picture apparatus for use with either a direct or alternating current supply circuit comprising a projection lamp, an amplifier circuit, and unitary means for supplying the amplifier with alternating current derived from said supply circuit irrespective of the type of current fed to said supply circuit and for supplying said lamp with current directly from said supply circuit.

2. Talking motion picture apparatus for use with either a direct or alternating current supply circuit comprising a projection lamp, an amplifier circuit, and unitary means for supplying the amplifier with alternating current derived from said supply circuit irrespective of the type of current fed to said supply circuit, and including means for supplying said lamp with current from said supply circuit.

3. Talking motion picture apparatus for use with either a direct or alternating current supply circuit comprising a projection lamp, an amplifier circuit, and unitary means for supplying the amplifier with alternating current derived from said supply circuit irrespective of the type of current fed to said supply circuit and for supplying said lamp with direct current from said supply circuit.

4. Talking motion picture apparatus for use with either a direct or alternating current supply circuit comprising a projection lamp, an amplifier circuit, and unitary automatic means for supplying the amplifier with alternating current derived from said supply circuit irrespective of the type of current fed to said supply circuit and for supplying said lamp with current directly from said supply circuit.

5. Talking motion picture apparatus for use with either a direct or alternating current supply circuit comprising a projection lamp, an amplifier circuit, and unitary means for supplying the amplifier with alternating current derived from said supply circuit irrespective of the type of current fed to said supply circuit and for independently supplying said lamp with current from said supply circuit.

6. Talking motion picture apparatus for use with either a direct or alternating current supply circuit comprising a projection lamp, an amplifier circuit, and unitary automatic means for supplying the amplifier with alternating current derived from said supply circuit irrespective of the type of current fed to said supply circuit and automatic for supplying said lamp with direct current from said supply circuit.

7. Talking motion picture apparatus for use with either a direct or alternating current supply circuit comprising a projection lamp, a motor, and an amplifier circuit, and unitary means for supplying the motor and the amplifier with alternating current derived from said supply circuit and for independently supplying said lamp with current from said supply circuit.

8. Talking motion picture apparatus for use with either a direct or alternating current supply circuit comprising a projection lamp, a motor, and an amplifier circuit, and unitary means for supplying the motor and the amplifier with alternating current derived from said supply circuit irrespective of the type of current fed to said supply circuit and for supplying said lamp with current directly from said supply circuit.

9. Talking motion picture apparatus for use with either a direct or alternating current supply circuit comprising a projection lamp, a motor, and an amplifier circuit, and unitary means for supplying the motor and the amplifier with alternating current derived from said supply circuit irrespective of the type of current fed to said supply circuit and for independently supplying said lamp with current from said supply circuit.

10. Talking motion picture apparatus for use with either a direct or alternating current supply circuit comprising a projection lamp, a motor, and an amplifier circuit, and unitary means for supplying the motor and the amplifier with alternating current derived from said supply circuit irrespective of the type of current fed to said supply circuit and for supplying said lamp with direct current from said supply circuit.

11. Talking motion picture apparatus for use with either a direct or alternating current supply circuit comprising a projection lamp, a motor, and an amplifier circuit, and unitary automatic means for supplying the motor and the amplifier with alternating current derived from said supply circuit irrespective of the type of current fed to said supply circuit and for supplying said lamp with current directly from said supply circuit.

12. Talking motion picture apparatus for use with either a direct or alternating current supply circuit comprising a projection lamp, a motor, and an amplifier circuit, and unitary means for supplying the motor and the amplifier with alternating current derived from said supply circuit irrespective of the type of current fed to said supply circuit and for independently supplying said lamp with current from said supply circuit.

13. Talking motion picture apparatus for use with either a direct or alternating current supply circuit comprising a projection lamp, a motor, and an amplifier circuit, and unitary automatic means for supplying the motor and the amplifier with alternating current derived from said supply circuit irrespective of the type of current fed to said supply circuit and for supplying said lamp with direct current from said supply circuit.

ALFRED N. GOLDSMITH.